June 10, 1930.  M. B. SKINNER  1,763,330
VALVE RESEATING TOOL
Filed Nov. 5, 1924
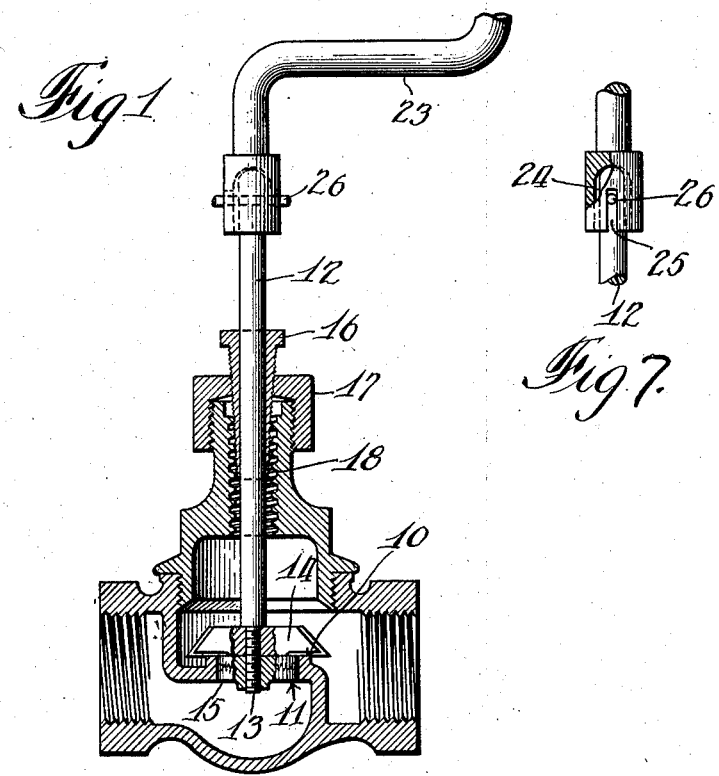
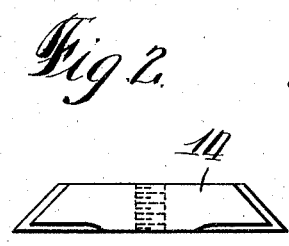
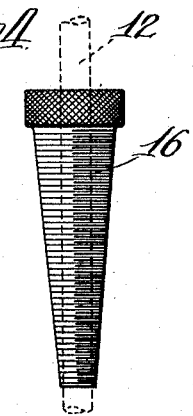
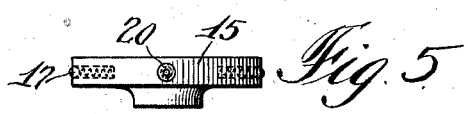
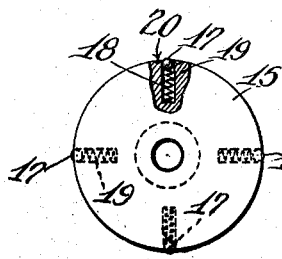
Inventor:
Mortimer B. Skinner
By Luther Johns
Atty Patented June 10, 1930

1,763,330

UNITED STATES PATENT OFFICE

MORTIMER B. SKINNER, OF WILMETTE, ILLINOIS

VALVE-RESEATING TOOL

Application filed November 5, 1924. Serial No. 747,898.

The present improvements relate to tools for resurfacing the seats of valves. The prime object of the invention is to increase the efficiency of such devices.

In some respects the present construction is an improvement upon the device of my Patent No. 1,061,694 of May 13, 1913.

In the drawings Figure 1 shows a globe valve in medial vertical section with my improved resurfacing tool partly broken away applied thereto; Fig. 2 is a side view and Fig. 3 is an end view of the cutter; Fig. 4 is an elevation of the upper bearing, centering member or guide; Fig. 5 is an edge view of the lower bearing member, pilot, centering device or guide; Fig. 6 is a top view of the device of Fig. 5 with a part broken away to show construction; and Fig. 7 is a fragmentary view of a part of Fig. 1 turned ninety degrees.

Valves of the general type illustrated are provided with an annular seat as 10 through which there is a circular seat opening 11 on the axis of the valve stem when the valve is operatively assembled.

The improved reseating tool comprises a shaft 12 having a reduced and screw-threaded portion 13 at its lower end, on which part 13 is threaded the cutter 14 (of any approved form) and a cylindrical pilot member, centering piece or bearing 15 occupying the seat opening 11. An upper bearing member 16 in the form of a relatively long truncated cone and having screw threads thereon encompasses with a nice fit the shaft 12, and, when applied either to the packing gland or bonnet 17, or to the interiorly threaded portion 18 of the valve, the upper portion of the shaft 12 is centered and held securely in its desired operative position.

One feature of improvement resides in threading the cutter as 14 and the centering device 15 directly upon the threaded end of the shaft, thus simplifying and reducing the number of parts and facilitating the assembling and separation of them in practice.

The upper centering member, guide or bearing 16 is an improvement over prior practices in that it is provided with a tapering surface of only a few degrees with respect to the axis, and has on its outer periphery a very fine screw thread, in my practice from thirty-six to forty threads to the inch. This fine thread coupled with the slight taper of the element makes for an unusually tight and strong fit between it and the bonnet 17, or between it and screw threads, for instance the threads 18 should the device be used without using the bonnet 17 as part of the supporting structure. Where such fine screw threads are threaded into a hole having relatively coarse screw threads the effect is very much the same as though the relatively coarse screw threads were not present, and is substantially the same as when the member 16 is threaded into the cylindrical hole at the top of the bonnet 17. Accordingly an unusually strong support is provided for the upper portion of the shaft 12.

A third improvement is in the characteristics of the lowering centering member, pilot, or guide 15. In this connection it should be observed that owing to shop practice in the manufacture of such valves the circular opening through the diaphragm containing the valve seat is found not to be of uniform diameter but varies in diameter in such small amounts as from a sixty-fourth to a thirty-second of an inch, and nearly always is smaller than it is supposed to be. The manufacturers do not consider such variations in the size of the valve seat opening as 11 vital or important, but they become highly important in view of the desirability of providing a centering element or snugly fitting pilot for such resurfacing tools adapted to bear upon the circular walls defining the valve seat opening. Unless the pilot or bearing, as for instance 15, fits the opening snugly the shaft as 12 is susceptible of vibrations detrimental to the result of a plane or smooth surface desired to be reproduced on the valve seat. Such looseness engenders a chattering of the cutter inimical to the desired results. Such chattering is substantially eliminated by a pilot which maintains a close fit with the surrounding walls by resilient elements acting as vibration absorbers.

To obtain the desired results I provide a centering piece or pilot member 15 having a plurality, as four, resilient elements at marginal portions thereof adapted to provide a snug fit between the guide and the wall defining the seat opening. These resilient members are preferably in the form of outwardly-spring-pressed steel balls 17 respectively accommodated in cylindrical recesses 18 and pressed outwardly by small coiled springs 19. To prevent the balls from coming out of the recesses respectively more than to a small extent I press a small ring-like indentation 20 in the metal around the opening of the recess 18 after the spring and ball are placed within the recess, thus forming a small annular lip about the opening and partly overlying the recess, providing a reduced diameter of the recess at the opening thereof holding each ball in its proper position.

The circular disc-like pilot 15 is made slightly smaller in diameter than what is supposed to be the diameter of the valve seat opening at 11. For instance if the valve seat opening at 11 is supposed to be one and one-half inches in diameter the disc-like pilot 15 is made almost a thirty-second of an inch smaller in diameter. The oppositely disposed balls 17 would in that instance project about a sixty-fourth of an inch, and the effective diameter of the pilot would be about, and preferably a trifle more than, one and one-half inches. If the valve seat opening should be exactly one and one-half inches in diameter the guide member would therefore fit snugly and with the balls engaging the circular wall defining the valve seat opening. Since it usually happens, however, that the seat opening at 11 is slightly smaller than it is supposed to be, when the tool is applied for use, the balls are pushed back and the desired snug fit is obtained. I prefer to have the balls project sufficiently so that if the valve seat opening is slightly larger than it is supposed to be the desired snug fit will result in that situation also.

Another advantage of the construction illustrated in this respect is that the bearing member 15 is provided with ball-bearings preventing some friction and providing an unusually smooth operation of the tool.

A fourth feature of improvement is in the universal joint provided at the top of the shaft 12 between it and the readily removable hand-brace 23 fragmentarily shown. The lower end of the brace is provided with a recess or socket 24 and a transverse slot 25 adapted to accommodate the cross-pin 26 rigid in the shaft 12. The top of the shaft 12 is rounded, as is also the end or bottom of the socket or recess 24. The relation of the top of the shaft 12 to the pin 26 is such, and the depth of the slot 25 is such also, that when the parts are operatively assembled the cross-pin 26 does not rest against the end walls of the slot 25, thus providing for rocking movements of the brace in vertical planes passing through the pin 26. Since the socket or recess 24 is of a materially greater diameter than is the top portion of the shaft 12 additional rocking movements are provided for, to the effect that a universal joint is provided whereby the socket end of the brace may swing around freely on top of the shaft 12.

This feature is important in view of the fact that the operator is seldom sufficiently skilled, or the place where he has to work is not sufficiently clear, to enable him to rotate the shaft and cutter by forces directed concentric with the shaft, and thus the shaft is rocked slightly, or at least undesirable strains are applied to parts desired to be maintained in their truly coaxial relation. Furthermore, such a universal joint enables the operator to work more rapidly since he is not required to exercise as great care as would otherwise be the case.

I contemplate as being included in the present improvements such changes, modifications and departures from what is herein specifically illustrated and described as fall within the scope of the appended claims.

I claim:

1. In a valve reseating tool of the character described for a valve having a wall defining a circular seat opening, the combination of a cutter, means for rotating the cutter, and a cylindrical pilot member having balls serving as bearings at edge portions thereof, said balls being mounted for inward and outward movement and being provided respectively with springs pressing them outward, the balls normally projecting slightly beyond the edge of the pilot member and being adapted to engage and move upon the wall defining the seat opening of the valve.

2. A pilot device for a valve reseating tool comprising in combination a disc-like member having a plurality of substantially radial holes extending inward from the circular periphery thereof, a spring and a ball in each of said holes arranged whereby the balls are spring-pressed outwardly, said holes respectively having a reduced diameter at the opening thereof whereby said balls may project but slightly beyond the periphery of the disc-like member.

MORTIMER B. SKINNER.